May 12, 1942.　　　A. N. PORTER　　　2,282,607
ROCKER BEARING
Filed Dec. 1, 1939　　　3 Sheets-Sheet 2
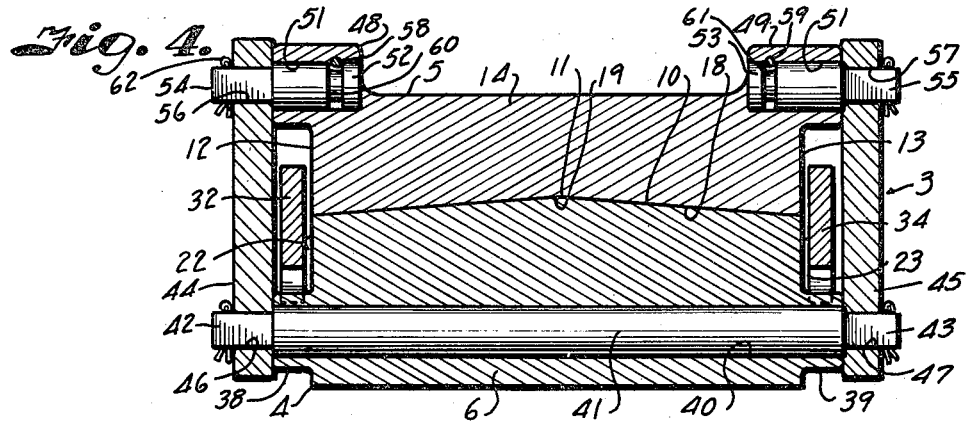
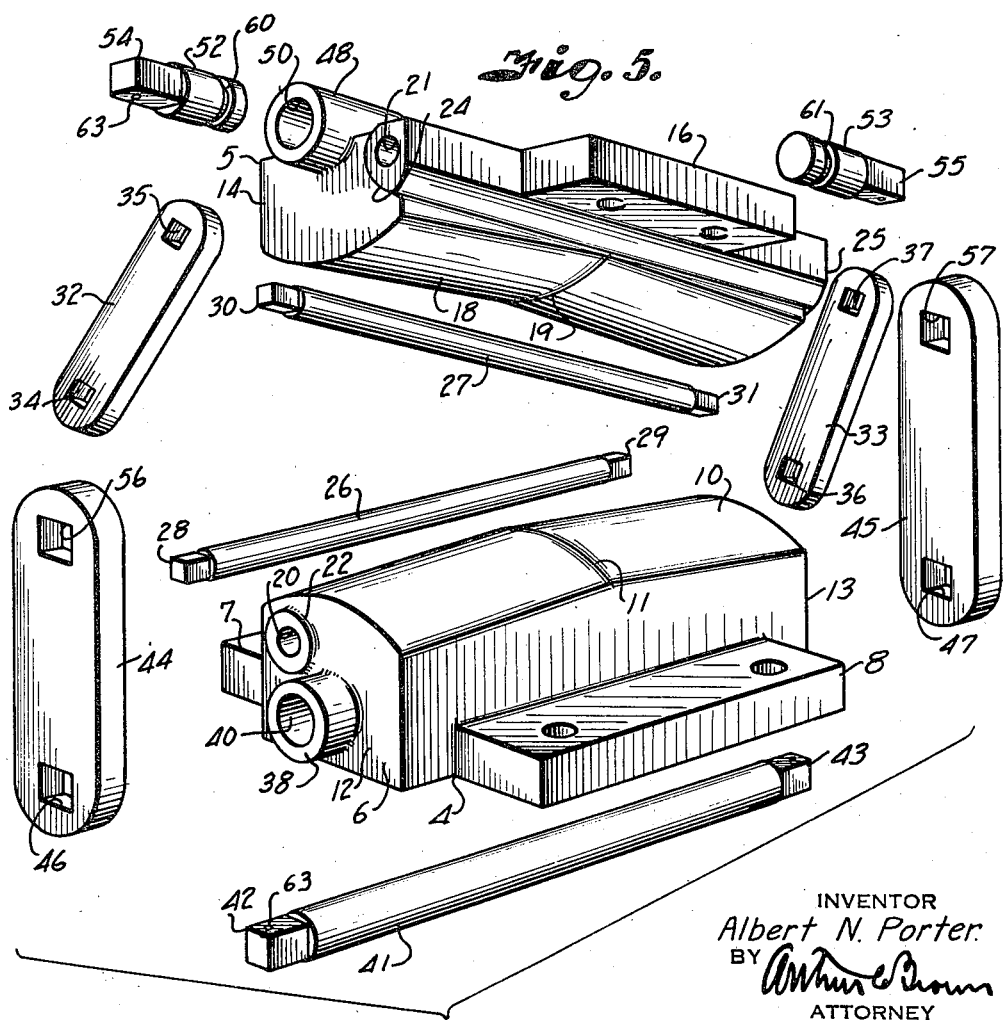
INVENTOR
Albert N. Porter
BY
ATTORNEY May 12, 1942.  A. N. PORTER  2,282,607
ROCKER BEARING
Filed Dec. 1, 1939  3 Sheets-Sheet 3
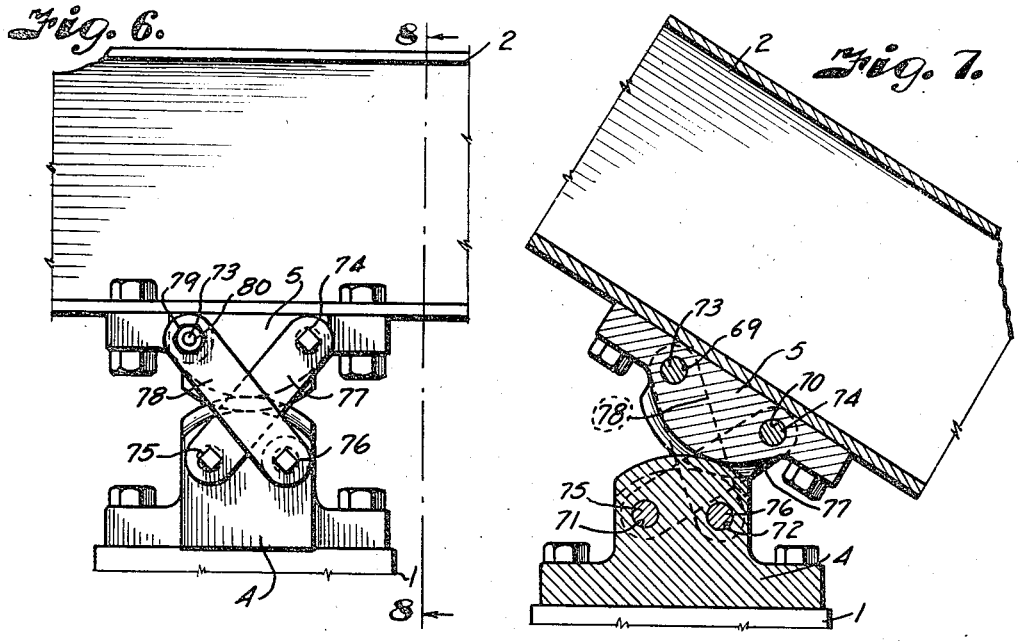
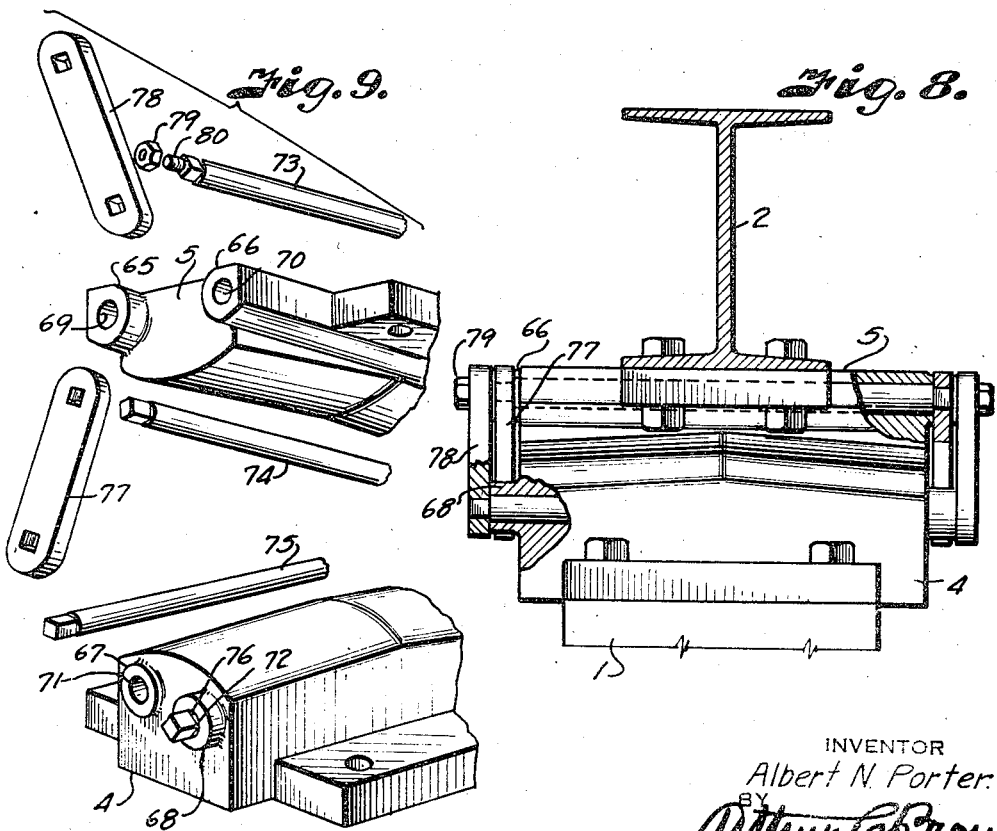
INVENTOR
Albert N. Porter.
BY
Arthur Lee Brown
ATTORNEY Patented May 12, 1942

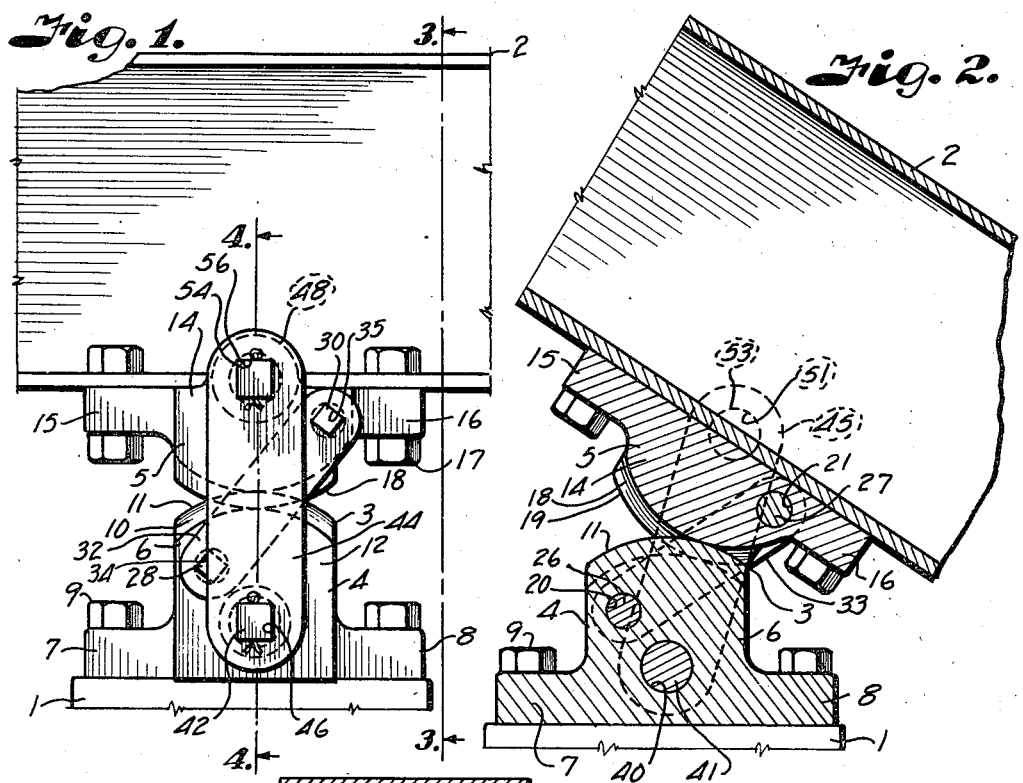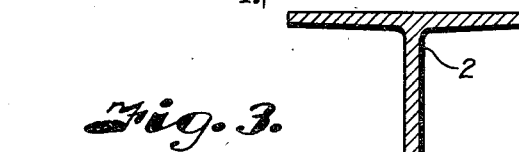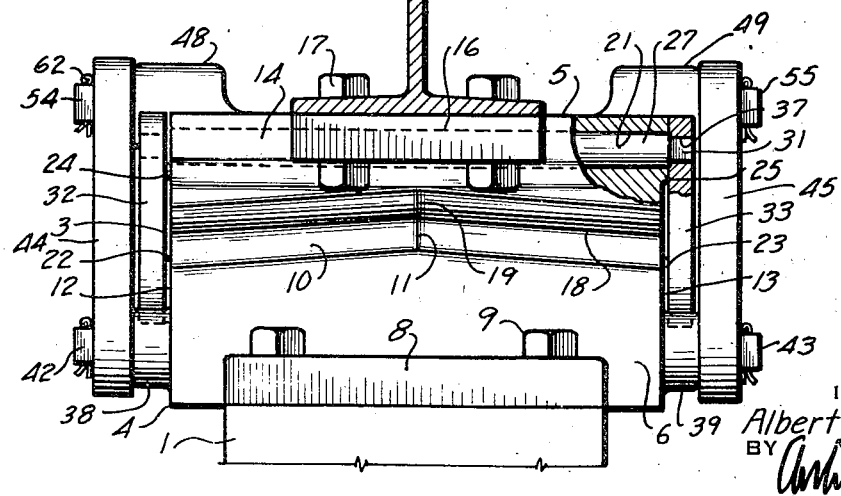

2,282,607

UNITED STATES PATENT OFFICE 2,282,607

ROCKER BEARING

Albert N. Porter, Tulsa, Okla., assignor to
J. F. Darby, Tulsa, Okla.

Application December 1, 1939, Serial No. 307,087

11 Claims. (Cl. 308—21)

This invention relates to bearings, particularly those of the rocker type and adapted for mounting an oscillatory member such as the walking beam on the Samson-post of a pumping rig.

Bearings of this character support tremendous weights and must be operative under adverse conditions encountered in oil field practice. For example, the bearings are subject to rapid wear and abrasion through improper lubrication, collection of sand, dirt, and other abrading foreign matter on the bearing surfaces. The bearing surfaces are also subject to defacement and breakage caused by the battering action resulting from too rapid operation of the pump rods, unseating and displacement of the beam in case of rod breakage, and for many other causes well known to the oil field industry.

It is, therefore, a principal object of the present invention to provide a rocking type bearing capable of operating under heavy loads without lubrication; to provide a rocker bearing wherein the bearing surfaces are self-cleaning of sand, dust, and other accumulating elements; to provide a rocker bearing which is self-supporting, thereby avoiding side wear and misalignment of the beam; and to provide a rocker bearing which is free acting and equipped with restraining means whereby the rocker member is positively retained on the fixed member regardless of the thrusts and whipping action imparted to the beam tending to separate the bearing surfaces.

In accomplishing these and other objects of the invention, I have provided improved details of structure, the preferred form of which is illustrated in the accompanying drawings, wherein:

Fig. 1 is a side elevational view of a rocker bearing constructed in accordance with the present invention and showing its adaptation for mounting the walking beam on the samson-post of a pumping rig, only the portions of the walking beam and Samson-post being shown to which the bearing is attached.

Fig. 2 is a longitudinal section through the rocker bearing showing the walking beam in tilted position as at the end of the downstroke of the rods.

Fig. 3 is a section on the line 3—3 of Fig. 1, and showing a part of the bearing broken away to better illustrate pivotal mounting of one of the retaining links.

Fig. 4 is a section through the bearing on the line 4—4 of Fig. 1.

Fig. 5 is a detail perspective view of the parts of the bearing shown in disassembled spaced relation to better illustrate the construction thereof.

Fig. 6 is a side view of a modified form of bearing.

Fig. 7 is a section through the modified form shown in Fig. 6.

Fig. 8 is a section on the line 8—8, Fig. 6 showing the bearing in end elevation with parts thereof broken away and in section to illustrate the link connections.

Fig. 9 is a perspective view of the parts of the bearing shown in disassembled spaced relation.

Referring more in detail to the drawings:

1 designates the upper portion of a samson-post, and 2 a walking beam which is oscillatably mounted on the post by a rocker bearing 3 constructed in accordance with the present invention. The bearing 3 includes a fixed member 4 and a rocking member 5.

The fixed member 4 comprises an elongated body 6 extending transversely across the top of the Samson-post 1 and provided with laterally extending flanges 7 and 8 that are secured to the post by suitable fastening devices such as bolts 9. The body portion 6 has a bearing surface 10 of arcuate cross-section, Fig. 2, and which slopes from the center 11 downwardly toward the ends 12 and 13 thereof as clearly shown in Figs. 4 and 5.

The bearing member 5 also includes an elongated body 14, having laterally extending flanges 15 and 16 to which the walking beam is attached by fastening devices such as bolts 17. The body 14 is provided with a bearing face 18 of arcuate cross-section and arranged reversely to the bearing surface 10 of the fixed bearing member. The bearing surface 18 slopes from the ends upwardly toward the median point 19 of the body at the same angle as the bearing surfaces of the fixed bearing member to form a concavity substantially coextensive with the arcuate bearing surface thereof, whereby the crown of the fixed bearing member 4 engages the V-shaped form of the rocking member 5 on a line contact, the line of contact being the common tangent points of the respective arcuate surfaces, as shown in Fig. 2. It is thus obvious that the central crown prevents movement of one bearing member relatively to the other in a sidewise direction relative to the beam.

In order to prevent shifting movement of the rocking member in a transverse direction relatively to the axis of oscillation, the bodies of the respective bearing members are provided with bores 20 and 21 respectively and which extend in parallel relationship with the axis of oscillation through bosses 22—23 for the fixed bearing member and 24—25 for the rocking bearing member.

Rotatable in the bores 20 and 21 are shafts 26 and 27, having polygonal or square shaped ends 28—29 and 30—31 projecting from the respective bosses to mount connecting links 32 and 33, the links being provided with squared apertures 34—35 and 36—37 to engage the squared ends of the respective shafts 26 and 27. The axes of the shafts are so arranged at the respective opposite corners of the bearing members that the rocking member has free rocking movement on the fixed bearing member and the links are of sufficient length to allow rocking movement but to prevent shifting of the rocking bearing member on the fixed bearing member.

As long as the thrusts imparted on the respective ends of the beam are uniform, the rocking bearing member retains its contact with the fixed bearing member, but when the beam is oscillated at too high a speed the power tends to force the rods on the downstroke, which results in lifting of the beam from seating contact with the fixed bearing member, causing pounding of the bearing surfaces. Also in case of rod breakage the sudden release of the rod causes whipping of the beam to disarrange the rocking bearing member from its bearing contact with the fixed bearing member. To avoid this difficulty the fixed bearing member is provided with end bosses 38 and 39 of sufficient length to project beyond the links 32 and 33, and extending through the bosses and the body of the bearing member is a bore 40 for accommodating a rock-shaft 41. The rock-shaft 41 has squared ends 42 and 43 projecting from the ends of the bosses to mount retaining links 44 and 45, the links 44 and 45 having squared apertures 46 and 47 to accommodate the squared ends of the shaft.

Formed on the rocking bearing member are bosses 48 and 49 having sockets 50 and 51 therein arranged with their axes extending parallel with the axis of the rock-shaft 41. Rotatably mounted in the bores are stub shafts 52 and 53 provided with squared ends 54 and 55 engaged in squared apertures 56 and 57 at the upper ends of the links 44 and 45. The stub shafts may be retained in the bores by pins 58 and 59 engaged in annular grooves 60 and 61 of the shafts. The links 44 and 45 are retained on the respective squared ends of the shaft 41 and the stub shafts 52 and 53 by cotter pins 62 which are projected through openings 63 in the respective squared ends. The axis of the shaft 41 is concentric with the arcuate surfaces of the fixed bearing member 4 and the aligned axes of the stub shafts are concentric with the arcuate surfaces of the rocking bearing member 5, so that the stub shafts 52 and 53 swing in an arc about the axis of the rock-shaft 41 to allow free rocking movement of the movable bearing member and yet retain the bearing members in line contact throughout the extent of rocking movement.

When a rocker bearing constructed and assembled as described is actuated through oscillation of the beam, the bearing surfaces of the rocker bearing member rock over the surface of the fixed bearing member and no lubricant is required. During this rocking movement the connecting links 32 and 33 pivot with the shaft 26 and their opposite ends swing on an arc. Simultaneously the links 44 and 45 pivot about the axis of the bore 40, with the stub shafts 52 and 53 swinging in an arc to retain the arcuate bearing surfaces of the respective bearing members in contact. It is thus obvious that any sudden thrusts acting on the beam will not cause unseating of the rocker bearing member. Consequently the rocking bearing member will rock freely on the arcuate bearing surface of the fixed bearing member.

Attention is directed to the arrangement of the arcuate bearing surfaces. The bearing surface for the rocking member, being inverted, cannot collect sand and dust which ordinarily cause abrasion, and the downwardly curved and outwardly sloping bearing surfaces of the fixed member clear themselves of sand and dirt that might tend to accumulate thereon.

While I have particularly described my invention as associated with the Samson-post and rocker beam of a pumping rig, it is obvious that the bearing may be used in connection with other working parts of a pumping unit without departing from the spirit of the invention. It is also obvious that other equivalent means may be used in connecting the links with their respective shafts so that the shafts are caused to rotate within the bores of the respective bearing member.

In the form of the invention shown in Figs. 6 to 8 inclusive, a different linkage is shown but the bearing members 4 and 5 are of the same construction as the bearing previously described with the exception of the bosses at the ends thereof. In this construction the ends of each member are provided with pairs of bosses 65—66 and 67—68 with the bosses of each pair arranged symmetrically on the respective sides of the vertical median line through the bearings and according to the spacing of the bosses 22 and 24, or 23 and 25 previously described. Extending through the bosses are bores 69—70 and 71—72 in which are journalled shafts 73—74 and 75—76 having squared ends similar to the shafts previously mentioned. Connecting the squared ends of the shafts 74 and 75 are links 77 and which are duplicates of the links 32 and 33 above described. Likewise connecting the squared ends of the shafts 73 and 76 are links 78 crossing the links 77, the latter links being retained by nuts 79 that are threaded upon reduced extensions 80 of the shaft 73 as shown.

With this arrangement, as the beam rocks, the outer links 78 swing over the links 77 and cooperate therewith in keeping the rocker bearing member 5 from lifting off the bearing member 4.

From the foregoing it is obvious that I have provided a rocker bearing which is capable of free operation regardless of thrusts imparted to the beam which ordinarily cause rapid disruption of rocker type bearings.

What I claim and desire to secure by Letters Patent is:

1. A bearing including a fixed bearing member having a body portion provided with a convex bearing surface of arcuate cross-section, a complementary bearing member having a similar body portion of reversely arranged arcuate cross-section having rocking contact on the bearing surface of the fixed bearing member, links having pivotal connection with said bearing members in the axes of said bearing surfaces, and a second pair of links having pivotal connections with the respective bearing members at points offset on the respective sides of the pivotal connections of the first named links.

2. A bearing including a fixed bearing member having a body portion provided with a convex bearing surface of arcuate cross-section, a complementary bearing member having a similar body portion of reversely arranged arcuate cross-section having rocking contact on the bearing surface of the fixed bearing member, each of said members having a bore extending parallel with the axis of curvature of the respective members with the bore of one of said members offset from a plane passing through the axes of curvature and with the bore of the other bearing member offset on the opposite side of said plane, shafts extending through said bores, links connecting the respective ends of the shafts, and means pivotally connecting the bearing members at said axes of curvature.

3. A bearing including a fixed bearing member having a body portion provided with a convex bearing surface of arcuate cross-section, a complementary bearing member having a similar body portion of reversely arranged arcuate cross-section having rocking contact on the bearing surface of the fixed bearing member, each of said members having bores extending parallel with and offset from the axis of curvature at opposite sides thereof, shafts extending through said bores, and crossed links connecting the ends of a shaft at one side of one bearing member with the ends of the shaft at the other side of the other bearing member, said links crossing each other at substantially the rocking contact point of said members.

4. A bearing including a fixed bearing member having a body portion provided with a convex bearing surface of arcuate cross-section, a complementary bearing member having a similar body portion of reversely arranged arcuate cross-section having rocking contact on the bearing surface of the fixed bearing member, said members having bores extending parallel with the axis of curvature of the respective members, shafts extending through said bores, links connecting the respective ends of the shafts, one of said members having a bore in the axis of curvature thereof, a shaft in said bore, stub shafts carried in the axis of curvature of the other member, and links connecting the last named shaft with the stub shafts.

5. A bearing including a fixed bearing member having a body portion provided with a convex bearing surface of arcuate cross-section, a complementary bearing member having a similar body portion of reversely arranged arcuate cross-section having rocking contact on the bearing surface of the fixed bearing member, said members having bores extending parallel with the axis of curvature of the respective members, shafts extending through said bores, links connecting the respective ends of the shafts, one of said members having a bore in the axis of curvature thereof, a shaft in said bore, stub shafts carried in the axis of curvature of the other member, and links connecting the last named shaft with the stub shafts, said links having fixed connection with the respective shafts.

6. A bearing including a pair of members having bearing surfaces of arcuate cross-section arranged with the bearing surface of one member in line contact with the bearing surface of the other, and crossed links having one of their ends pivotally connected with a bearing member on one side of a plane extending through the axes of said arcuate cross-sections and their other ends connected with the other bearing member at the opposite side of said plane with said links crossing at the line of contact.

7. A bearing including a bearing member having a bearing surface of arcuate cross-section and crowned transversely of said arcuate cross-section from outer sides thereof toward the center of said bearing surface, a cooperating bearing member having a bearing surface of a shape to receive said crowned bearing surface of the other bearing member and of reversely arranged arcuate section whereby one of said members rocks upon the other, each of said members having a bore extending parallel with and offset from the axis of curvature at opposite sides thereof, shafts extending through said bores, and links connecting ends of a shaft at one side of one bearing member with the ends of the shaft at the other side of the other bearing member.

8. A bearing including a bearing member having a bearing surface of arcuate cross-section and crowned transversely of said arcuate cross-section from outer sides thereof toward the center of said bearing surface, a cooperating bearing member having a bearing surface of a shape to receive said crowned bearing surface of the other bearing member and of reversely arranged arcuate section whereby one of said members rocks upon the other, each of said members having a bore extending parallel with and offset from the axis of curvature at opposite sides thereof, shafts extending through said bores, links connecting ends of a shaft at one side of one bearing member with the ends of the shaft at the other side of the other bearing member, and links having pivotal connection with the respective bearing members at said axis of curvature.

9. A bearing including a bearing member having a bearing surface of arcuate cross-section, a reversely arranged cooperative bearing member having a bearing surface of similar arcuate cross-section in rocking engagement with the bearing surface of the first named member on a line of tangency transversely of said bearing members, one of said members having a crowned portion extending transversely across the width of the arcuate section thereof and the other a concavity interfitting with the crowned portion to prevent lateral movement of one bearing member relative to the other, and links connecting said members on pivotal axes located in a plane extending through said line of tangency to maintain said rocking contact.

10. A bearing including a bearing member having a bearing surface of arcuate cross-section extending in the pivotal direction of the bearing, a cooperating bearing member having a bearing surface of reversely arranged arcuate cross-section and having rocking contact on the other bearing member, one of said bearing members having a crowned portion extending transversely across the width of said arcuate cross-section and the other bearing member having a recess interfitting the crowned portion to prevent lateral movement of one bearing member relative to the other, and pairs of crossed links pivotally connecting said members to maintain said rocking contact.

11. A bearing including a bearing member having a bearing surface of arcuate cross-section in the direction of pivotal movement of said bearing and of greater radius at the center than at the sides thereof to form a crown extending transversely of said arcuate cross-section, and a reversely arranged cooperating bearing member having a bearing surface of similar arcuate cross-section and of less radius at the sides than the center to form a concavity substantially coextensive with said arcuate surface for rocking contact with the other bearing member and to accommodate said crown bearing surface of the other bearing member for preventing lateral movement of one bearing member relative to the other, one of said bearing members being fixed and the other movable whereby the movable member is adapted to rock upon the fixed member.

ALBERT N. PORTER.